weight

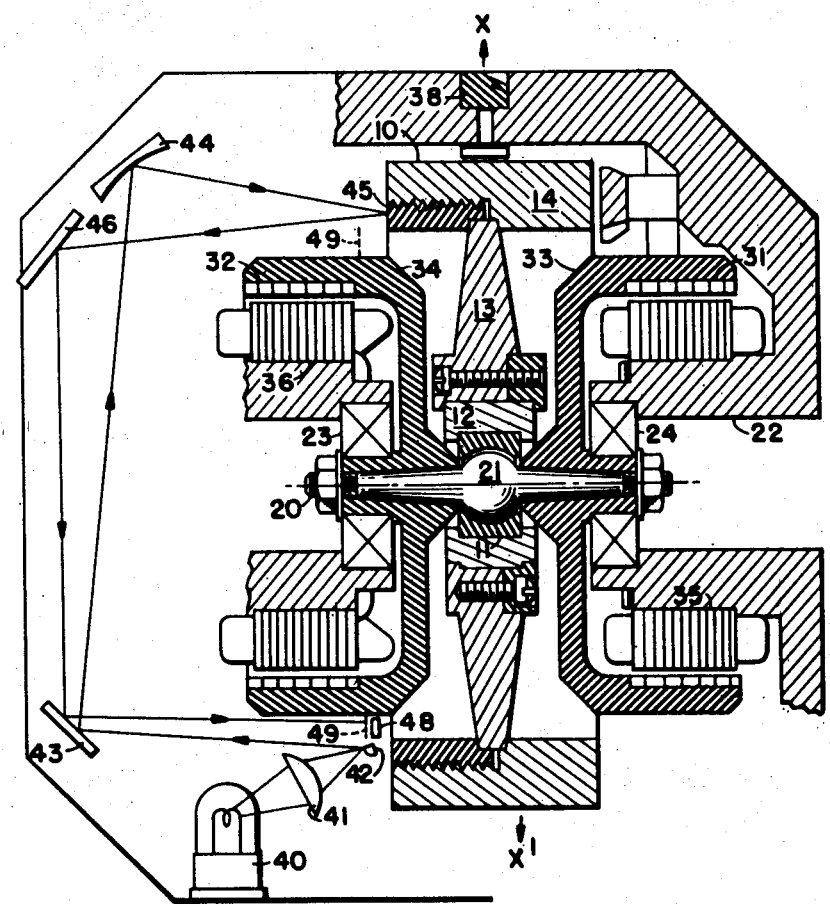

United States Patent Office 3,142,183
Patented July 28, 1964

3,142,183
FREE GYROSCOPE
Ernest B. Dane, Jr., Belmont, Mass., assignor to Massachusetts Institute of Technology, Cambridge, Mass., a corporation of Massachusetts
Filed Apr. 7, 1961, Ser. No. 101,589
3 Claims. (Cl. 74—5.7)

This invention relates to free gyroscopes and more particularly to a novel supporting bearing for such a gyroscope. A free gyroscope is an instrument which features a wheel or other rotatable body so designed that when operated it may be rotated at a high angular rate about a stable spin axis in a manner such that the vector sum of all torques applied to the wheel is, and remains, substantially zero. To achieve this result it is necessary that driving and frictional torques act precisely on the spin axis and the resultant of supporting forces act at the center of gravity. W. H. Knuz Patent 2,959,060 of November 8, 1960 discloses one form of free gyroscope. Since it is difficult to maintain the necessary balance of forces for variable orientations between the wheel and its supporting structure, it is customary to provide means whereby the supporting structure is made to follow the wheel to a very close degree of approximation. However, it is the wheel which leads; the structure merely follows.

The object of this invention is to provide a support system for a free gyroscope providing rolling contact between a spherical bushing and a spherical journal which comprises the bearing member such that the average position of the supporting force tends to pass through the center of the bearing member.

FIG. 1 is a cross sectional drawing of an embodiment of the invention. The wheel 10 comprises a spherical bushing 11, a bushing support 12, a web 13, and a rim 14. The wheel 10 is supported by a shaft 20 having a central spherical journal portion 21. The radius of the spherical journal 21 is slightly less than the radius of the spherical bushing 11. The shaft 20 is supported within the instrument case 22 by precision bearings 23 and 24. Rotors 33 and 34 of motors 31 and 32 are attached to the shaft 20. The shaft 20 may be driven at high speed from both ends by the synchronous motors 31 and 32. The motor stators 35 and 36 are attached to the case 22. In operation, the shaft 20 is driven at synchronous speed while the wheel 10 lags behind by an amount depending upon the ratio of the radius of the journal 21 to the radius of the spherical bushing 11 and also upon the amount of friction drag torque tending to resist the rotation of the wheel 10. Permanent magnets 38 may be added to increase friction as required. If there were no friction, the journal 21 and the spherical bushing 11 would tend to maintain contact at only one point and rotate together at synchronous speed. The desirable characteristics of the system would be lost. When there is a friction tending to resist the rotation of the wheel 10 the point of contact between the bushing 11 and the journal 21 rotates around the spin axis at nearly the angular velocity $W_1$ of the wheel.

$W_1$ is given by the equation:

$$W_1 = (W_3 - W_2)\frac{r}{R} + W_2$$

where $W_2$ is the angular velocity of the shaft 20, and $r$ is the radius of the journal 21. R is the radius of the bushing 11, and $W_3$ is the angular velocity of the point of contact about the spin axis. As the point of contact rotates about the center of the journal 21 with angular velocity $W_3$, the centrifugal force presses the bushing 11 against the journal.

In general the angular velocity of the journal is not the same as that of the wheel. The difference in angular velocity contains components from base motion, and a component from the rolling of the bushing 11 about the journal 21. If the latter component is made very large in comparison with the base motion components, the angular velocity vectors of the journal and the wheel are made to very nearly coincide in direction, while differing substantially in magnitude. Base motion, then, results in only slight changes in the direction of the rolling contact. For rolling contact between a sphere and a lightly oiled surface, ball bearing studies have shown that there is very little resistance to slight changes in the direction of rolling. Thus undesirable torques are substantially eliminated from the support system.

A feedback system is employed, by which the axis of the case 22 is held in close alignment with the axis of the wheel. Deviations between wheel 10 axis and case may be detected by optical means, as shown. Rotation about an axis perpendicular to the plane of the section is detected by an optical system. Light from a lamp 40 is concentrated by a lens 41 upon a thin mirror 42, which serves as a slit source. Light from the mirror 42 is reflected in turn by a second mirror 43, and a concave mirror 44 upon a polished face 45 of the wheel 10 defining a plane perpendicular to its spin axis. From the wheel the light is reflected into a fourth mirror 46, then back to the second mirror 43 and into a photocell 48 where the image of the thin mirror is focused by the concave mirror 44. Rotating across the face of the photocell 48 is a shutter 49 which is attached to the rotor 34. This shutter may be a toothed wheel; but it is preferred that it comprise a disc of a transparent plastic material, such as the polyester film "mylar" on which an opaque pattern is printed. The shutter produces modulation of the output current from the photocell. The opaque pattern, makes the character of the modulation a sensitive measure of the position of the bright image of the slit source relative to the shutter and, hence of the angular orientation of the wheel. By a negative feedback system of detectors, amplifiers, servo motors and gimbals the case 22 is rotated in the plane of the figure to maintain the desired alignment.

Similarly a second optical system perpendicular to the one shown may be employed to detect and control the relative motion of the case about the axis X—X'.

Having thus described the invention, what is claimed as new is:

1. A precision free gyroscope comprising
   (a) an instrument case,
   (b) a spherical journal contained within said case,
   (c) means for rotating said journal about an axis of said case,
   (d) means for constraining the rotation of said journal to said axis,
   (e) a gyroscope wheel having a stable spin axis,
   (f) a spherical bushing, centrally fixed in said wheel encircling said journal, having a slightly greater radius of curvature than said journal,
   (g) means for applying a drag torque to said wheel to urge said wheel to lag the rotation of said journal, characterized in that the clearance between said journal and said bushing is sufficient that rolling contact is maintained between said bushing and said journal as said wheel is driven by rotation of said journal at operating speed.

2. A precision free gyroscope for use in a feedback system by which supporting structure for said gyroscope is made to follow a gyroscope wheel to a close degree of approximations, said gyroscope comprising
   (a) an instrument case for attachment to said structure,
   (b) a journal within said case containing a central bearing-ball-like spherical portion, (c) means for rotating said journal about an axis of said case,
(d) means for constraining the rotation of said journal to said axis,
(e) a gyroscope wheel having a stable spin axis,
(f) a spherical ball-race-like bushing centrally fixed in said wheel, encircling said portion, having a slightly greater radius of curvature than said portion, and
(g) means for applying a drag torque to said wheel, to urge said wheel to lag the rotation of said journal characterized in that the clearance between said journal and said bushing is sufficient that rolling contact is maintained between said bushing and said journal as said wheel is driven by rotation of said journal at operating speed.

3. A precision free gyroscope for use in a feedback system by which supporting structure for said gyroscope is made to follow a gyroscope wheel to a close degree of approximations, said gyroscope comprising
(a) an instrument case,
(b) a journal within said case containing a central bearing-ball-like spherical portion,
(c) means for rotating said journal about an axis of said case,
(d) means for constraining the rotation of said journal to said axis,
(e) a gyroscope wheel having a rim and stable spin axis,
(f) a spherical ball-race-like bushing centrally fixed in said wheel, encircling said portion, having a slightly greater radius of curvature than said portion,
(g) a magnet fixed to said case in proximity to said rim, the clearance between said portion and said bushing being sufficient that ball-bearing-like rolling contact is maintained between said bushing and said portion as said wheel is driven by rotation of said portion at operating speed.

References Cited in the file of this patent

UNITED STATES PATENTS

| | | |
|---|---|---|
| 2,729,106 | Mathiesen | Jan. 3, 1956 |
| 2,815,584 | Watson | Dec. 10, 1957 |
| 2,879,668 | Mleczko | Mar. 31, 1959 |
| 2,940,318 | Adams et al. | June 14, 1960 |
| 3,025,708 | Slater et al. | Mar. 20, 1962 |